US012536447B2

(12) United States Patent
Castiglia et al.

(10) Patent No.: US 12,536,447 B2
(45) Date of Patent: Jan. 27, 2026

(54) FEATURE SELECTION IN VERTICAL FEDERATED LEARNING

(71) Applicants: International Business Machines Corporation, Armonk, NY (US); Rensselaer Polytechnic Institute, Troy, NY (US)

(72) Inventors: Timothy John Castiglia, Troy, NY (US); Yi Zhou, San Jose, CA (US); Nathalie Baracaldo Angel, San Jose, CA (US); Swanand Ravindra Kadhe, San Jose, CA (US); Shiqiang Wang, White Plains, NY (US); Stacy Elizabeth Patterson, Troy, NY (US)

(73) Assignees: INTERNATIONAL BUSINESS MACHINES CORPORATION, Armonk, NY (US); RENSSELAER POLYTECHNIC INSTITUTE, Troy, NY (US)

( * ) Notice: Subject to any disclaimer, the term of this patent is extended or adjusted under 35 U.S.C. 154(b) by 593 days.

(21) Appl. No.: 18/156,064

(22) Filed: Jan. 18, 2023

(65) Prior Publication Data

US 2024/0242087 A1 Jul. 18, 2024

(51) Int. Cl.
G06F 16/00 (2019.01)
G06N 3/098 (2023.01)

(52) U.S. Cl.
CPC .................................. G06N 3/098 (2023.01)

(58) Field of Classification Search
CPC ..................................................... G06N 3/098
(Continued)

(56) References Cited

U.S. PATENT DOCUMENTS 11,651,194 B2 * 5/2023 Ren ........................... G06N 3/04
706/15
11,657,094 B2 * 5/2023 Moon ..................... G06N 3/084
706/15

(Continued)

FOREIGN PATENT DOCUMENTS

CN 114676838 A 6/2022

OTHER PUBLICATIONS

Wu, J. et al. | "Hierarchical Personalized Federated Learning for User Modeling." WWW '21, Apr. 19-23, 2021, Ljubljana, Slovenia, 12 pages.

(Continued)

Primary Examiner — Alexandria Y Bromell
(74) Attorney, Agent, or Firm — Amin, Turocy & Watson, LLP

(57) ABSTRACT

Systems and techniques that facilitate feature selection in vertical federated learning are provided. For example, one or more embodiments described herein can comprise a system, which can comprise a memory that can store computer executable components. The system can also comprise a processor, operably coupled to the memory that can execute the computer executable components stored in memory. The computer executable components can comprise an aggregator machine learning model that aggregates a plurality of embedding components from one or more local machine learning models and removes one or more embedding components based on minimizing weights at an input layer of the aggregator machine learning model.

14 Claims, 14 Drawing Sheets

(58) Field of Classification Search
USPC .......................................................... 706/15
See application file for complete search history.

(56) References Cited

U.S. PATENT DOCUMENTS

| | | | | |
|---|---|---|---|---|
| 11,691,650 | B2* | 7/2023 | Li | G06F 16/903 706/15 |
| 2011/0071969 | A1* | 3/2011 | Doctor | G06N 3/043 706/15 |
| 2023/0089481 | A1* | 3/2023 | Liu | G06N 3/0455 706/15 |
| 2023/0121812 | A1* | 4/2023 | Yin | G06V 10/774 706/15 |
| 2023/0124261 | A1* | 4/2023 | Uria-Martínez | G06N 3/044 706/15 |
| 2023/0206076 | A1* | 6/2023 | Xu | G06N 3/096 706/15 |
| 2023/0224225 | A1* | 7/2023 | Potluru | H04L 41/16 706/15 |
| 2023/0237315 | A1* | 7/2023 | Baykal | G06N 3/044 706/15 |

OTHER PUBLICATIONS

Hiu, K. et al. | "FedGCN: Federated Learning-Based Graph Convolutional Networks for Non-Euclidean Spatial Data." Mathematics 2022, 10, 1000; https://doi.org/10.3390/math10061000, Published: Mar. 21, 2022, 24 pages.

Han, X. et al. | "Data Valuation for Vertical Federated Learning: An Information-Theoretic Approach." arXiv:2112.08364v1 [cs.LG] Dec. 15, 2021, 37 pages.

Wang, G. et al. | "Measure contribution of participants in federated learning." In 2019 IEEE International Conference on Big Data, 2019, pp. 2597-2604, doi: 10.1109/BigData47090.2019.9006179, 8 pages.

Feng, S. et al. | "Multi-participant multi-class vertical federated learning." arXiv:2001.11154v1 [cs.LG] Jan. 30, 2020, 7 pages.

Chen, X. et al. | "Fed-EINI: An Efficient and Interpretable Inference Framework for Decision Tree Ensembles in Vertical Federated Learning." In 2021 IEEE International Conference on Big Data, 2021 IEEE, Doi: 10.1109/BigData52589.2021.9671749, 7 pages.

Chen, P. et al. | "EVFL: An explainable vertical federated learning for data-oriented Artificial Intelligence systems." Journal of Systems Architecture, 126 (2022) 102474, 12 pages.

Hou, J. et al. | "Verifiable privacy-preserving scheme based on vertical federated random forest." IEEE Internet of Things Journal, DOI 10.1109/JIOT.2021.3090951, 2021, 16 pages.

Fan, Zh. et al. | "Fair and efficient contribution valuation for vertical federated learning." arXiv:2201.02658v1 [cs.LG] Jan. 7, 2022, 20 pages.

Zhang, Y. et al. | "An embedded vertical-federated feature selection algorithm based on particle swarm optimisation." CAAI Transactions on Intelligence Technology, 2022; 1-21, DOI: 10.1049/cit2.12122, 21 pages.

Zhang, R. et al. | "Secure Feature Selection for Vertical Federated Learning in eHealth Systems." IEEE International Conference on Communications, 2022 IEEE, DOI: 10.1109/ICC45855.2022.9838917, 6 pages.

* cited by examiner

FEATURE SELECTION IN VERTICAL FEDERATED LEARNING

BACKGROUND

The subject disclosure relates to vertical federated learning, and more specifically, to feature selection in vertical federated learning.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate feature selection in vertical federated learning are provided.

According to an embodiment, a system can comprise a processor that executes computer executable components stored in memory. The computer executable components comprise an aggregator machine learning model that aggregates a plurality of embedding components from one or more local machine learning models and removes one or more embedding components from the plurality of embedding components based on minimizing weights at an input layer of the aggregator machine learning model. An advantage of such a system, is that it allows for identification and removal of embeddings that have little or no impact on performance of the aggregator machine learning model, thus reducing the computations needed to train the aggregator machine learning model.

In some embodiments, the computer executable components can further comprise a communications component that notifies the one or more local machine learning models of the removal of the one or more embedding components, wherein the one or more local machine learning models remove one or more features from input layers of the one or more local machine learning models based on the removing of the one or more embedding components. An advantage of such a system is that it allows for removal of unimportant features from the local machine learning models, thus improving performance of the aggregator machine learning model.

According to another embodiment, a computer-implemented method can comprise aggregating, by a system operatively coupled to a processor, a plurality of embedding components from one or more local machine learning models to an aggregator machine learning model; and removing, by the system, one or more embedding components from the plurality of embedding components based on minimizing weights at an input layer of the aggregator machine learning model. An advantage of such a computer-implemented method is that it allows for identification and removal of embeddings that have little or no impact on performance of the aggregator machine learning model, thus reducing the amount of computations needed to train the aggregator machine learning model.

In some embodiments, the above computer-implemented method can further comprise notifying, by the system, the one or more local machine learning models of the removing of the one or more embedding components; removing, by the system, one or more features from input layers of the one or more local machine learning models based on the removing of the one or more embedding components. An advantage of such a computer-implemented method is that it allows for removal of unimportant features from the local machine learning models, thus improving performance of the aggregator machine learning model.

According to another embodiment, a computer program product comprising a computer readable storage medium having program instructions embodied therewith, the program instructions executable by a processor to cause the processor to aggregate a plurality of embedding components from one or more local machine learning models to an aggregator machine learning model; and remove one or more embedding components from the plurality of embedding components based on minimizing weights at an input layer of the aggregator machine learning model. An advantage of such a computer program product is that it allows for identification and removal of embeddings that have little or no impact on performance of the aggregator machine learning model, thus reducing the amount of computations needed to train the aggregator machine learning model.

In some embodiments, the program instructions are further executable by the processor to cause the processor to notify the one or more local machine learning models of removal of the one or more embedding components; and remove one or more features from input layers of the one or more local machine learning models based on the removing of the one or more embedding components. An advantage of such a computer program product is that it allows for removal of unimportant features from the local machine learning models, thus improving performance of the aggregator machine learning model.

DETAILED DESCRIPTION

Figure 1:
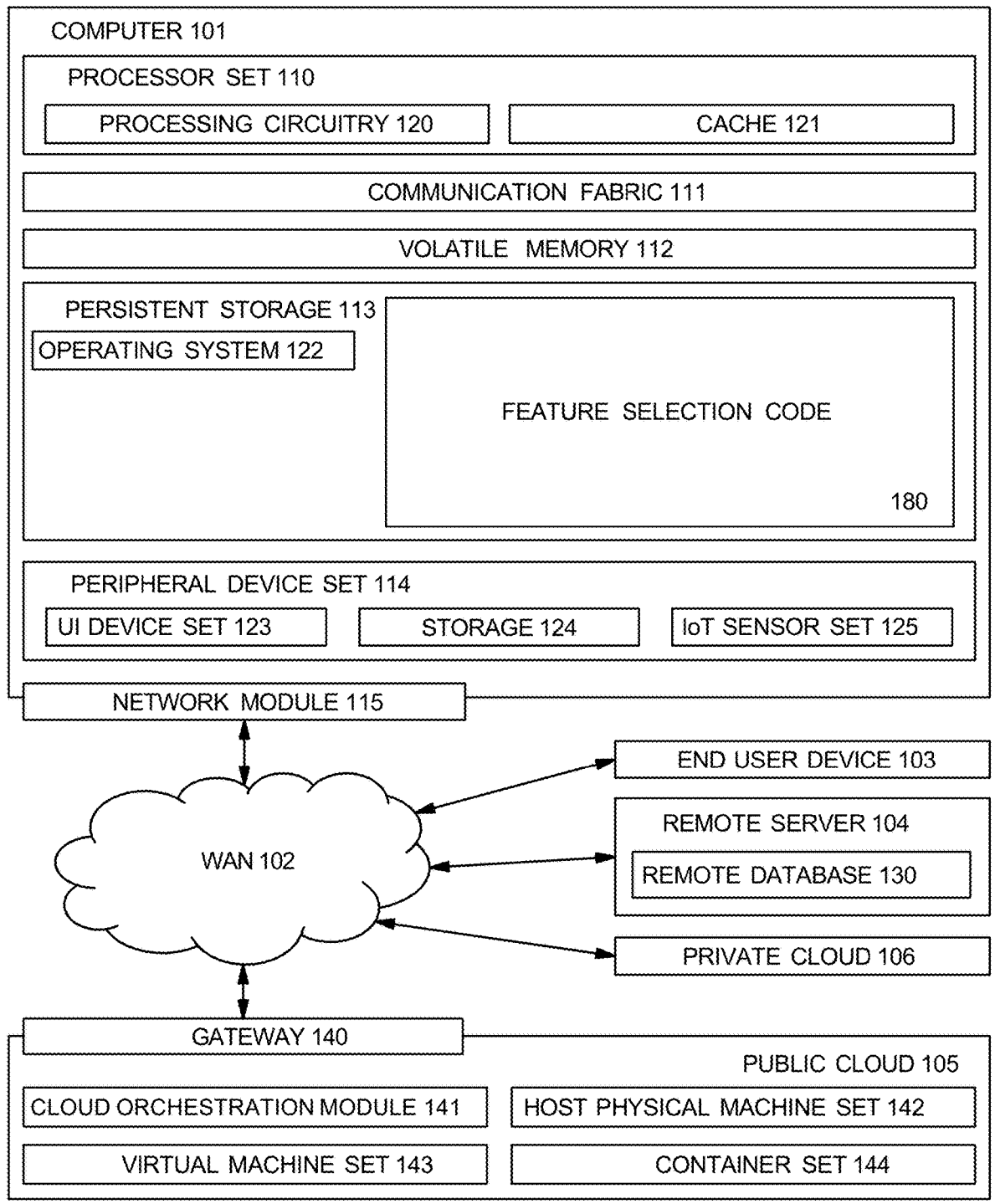
FIG. 1 illustrates an example, non-limiting environment for the execution of at least some of the computer code in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

In federated learning, one or more local machine learning models are trained to output embedding data, which is then aggregated and used to train an aggregator machine learning model. By training the aggregator machine learning model on the embeddings as opposed to the training data of the local machine learning models, there is no centralization of the local training data, leading to better data protection.

Within federated learning, there are two approaches; horizontal federated learning and vertical federated learning. In horizontal federated learning, the feature space is shared, while the sample space is not shared. For example, in horizontal learning, data pertaining to multiple entities with the same features are used. In contrast, in vertical learning the sample space is shared while the feature space is not shared. For example, data pertaining to a single entity from multiple sources, and thus with different features, is used. As such, vertical federated learning often involves a large number of features, which can lead to overfitting, large computational costs, and decreased model performance due to correlated or redundant features. Furthermore, feature selection is often performed after training of the aggregator machine learning model, leading to high communication costs during training, as embedding for all features are passed to the aggregator model during training.

In view of the problems discussed above, in relation to vertical federated learning, the present disclosure can be implemented to produce a solution to one or more of these problems by aggregating a plurality of embedding components from one or more local machine learning models to an aggregator machine learning model, and removing by the system, one or more embedding components from the plurality of embedding components based on minimizing weights at an input layer of the aggregator machine learning model. For example, the local machine learning models can be trained to output embedding vectors (e.g., low-dimensional representations) from input values. In various embodiments, the local models can comprise models such as linear models, support vector machines (SVM), neural networks, or other suitable machine learning models. The embedding components can then be aggregated by the aggregator machine learning model, which can utilize the embeddings components as training data for a fusion model. By utilizing the embeddings as training data for the aggregator models, the input data utilized by the local machine learning models remains decentralized (e.g., not shared outside the local model), thus leading to better data protection and security. Once the aggregator machine learning model receives the plurality of embeddings components, the aggregator machine learning model can solve an optimization problem that minimizes weights at the input layer of the machine learning model (e.g., the plurality of embeddings) while maintaining model performance (e.g., loss). By identifying the embeddings with the smallest weights, embedding components that have minimal impact on the aggregator machine learning model can be identified and removed from the input layer of the aggregator machine learning model.

In a further embodiment, the one or more local machine learning models can be notified of the removal of the one or more embeddings from the plurality of embeddings and can remove one or more features from input layers of the one or more machine learning models based on the removing the one or more embeddings. For example, the one or more local machine learning models can utilize the removed embeddings and the original plurality of embeddings as input to solve an optimization problem that minimizes weights at the input layer of the one or more local machine learning models. As such, the removed embeddings (e.g., embeddings of lesser importance to the aggregator machine learning model) can be utilized to identify features of lesser importance, which can be removed at the input layers of the one or more local machine learning models. Accordingly, the removal of the features can improve performance of the federated learning system by preventing overfitting, decreasing the computation cost of operations due to the decrease in features, and remove features that are redundant or correlated, thereby improving performance of the aggregator machine learning model.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 and the following discussion are intended to provide a brief, general description of a suitable computing environment 100 in which one or more embodiments described herein at FIGS. 2-11 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as translation of an original source code based on a configuration of a target system by the feature selection code block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method can be distributed among multiple computers and/or between multiple locations. On the other hand, in this presentation of computing environment 100, detailed discussion is focused on a single computer, specifically computer 101, to keep the presentation as simple as possible.

Computer 101 can be located in a cloud, even though it is not shown in a cloud in FIG. 1. On the other hand, computer 101 is not required to be in a cloud except to any extent as can be affirmatively indicated.

PROCESSOR SET 110 includes one, or more, computer processors of any type now known or to be developed in the future. Processing circuitry 120 can be distributed over multiple packages, for example, multiple, coordinated integrated circuit chips. Processing circuitry 120 can implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set can be located "off chip." In some computing environments, processor set 110 can be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods can be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory can be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 can be a read only memory (ROM), but typically at least a portion of the persistent storage allows writing of data, deletion of data and re-writing of data. Some familiar forms of persistent storage include magnetic disks and solid-state storage devices. Operating system 122 can take several forms, such as various known proprietary operating systems or open-source Portable Operating System Interface type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 can include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 can be persistent and/or volatile. In some embodiments, storage 124 can take the form of a quantum computing storage device for storing data in the form of qubits. In embodiments where computer 101 is required to have a large amount of storage (for example, where computer 101 locally stores and manages a large database) then this storage can be provided by peripheral storage devices designed for storing large amounts of data, such as a storage area network (SAN) that is shared by multiple, geographically distributed computers. IoT sensor set 125 is made up of sensors that can be used in Internet of Things applications. For example, one sensor can be a thermometer and another sensor can be a motion detector.

NETWORK MODULE 115 is the collection of computer software, hardware, and firmware that allows computer 101 to communicate with other computers through WAN 102. Network module 115 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and can take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 can be a client device, such as thin client, heavy client, mainframe computer and/or desktop computer.

REMOTE SERVER 104 is any computer system that serves at least some data and/or functionality to computer 101. Remote server 104 can be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data can be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs can be stored as images and can be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware and firmware allowing public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Figure 2A:
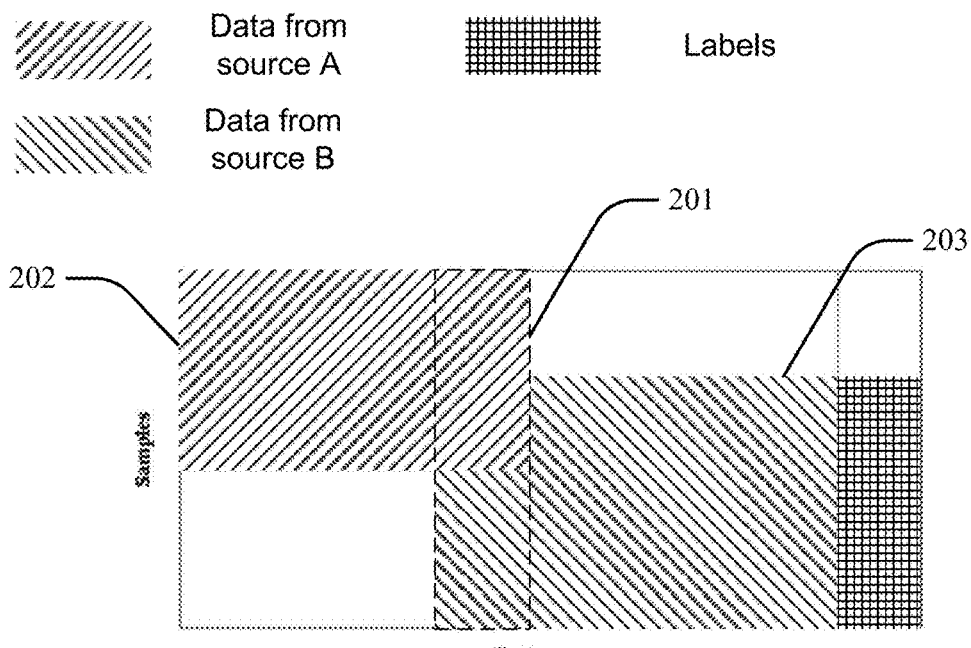
FIG. 2A illustrates a visual representation of horizontal federated learning in accordance with one or more embodiments described herein.

FIG. 2A illustrates a visual representation of horizontal federated learning in accordance with one or more embodiments described herein.

As shown by FIG. 2A, in horizontal learning space 201, data from source A 202 and data from source B 203 share points along the x-axis (e.g., features), while points along the y-axis (e.g., samples) are not shared. For example, in horizontal learning, a single type of feature from multiple entities is utilized.

Figure 2B:
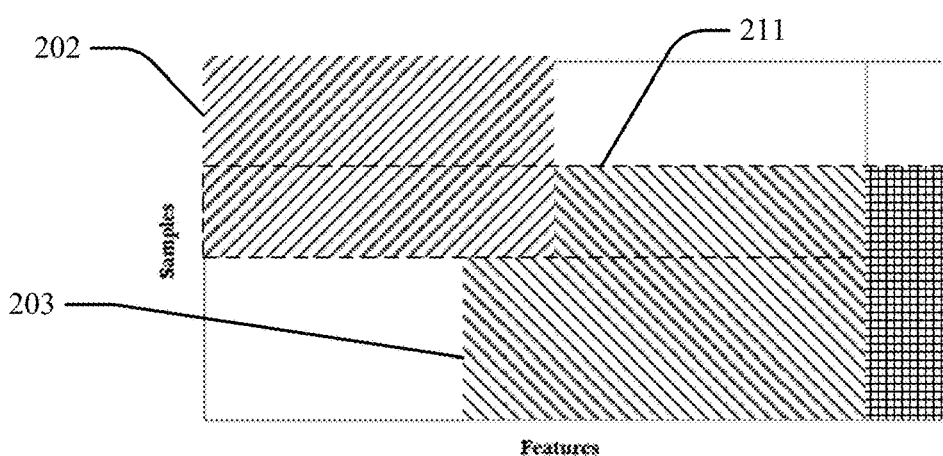
FIG. 2B illustrates a visual representation of vertical federated learning in accordance with one or more embodiments described herein.

FIG. 2B illustrates a visual representation of vertical federated learning in accordance with one or more embodiments described herein.

As shown by FIG. 2B, in vertical learning space 211, data from source A 202 and data from source B 203 share points along the y-axis (e.g., samples), while points along the x-axis (e.g., features) are not shared. For example, multiple features about a single entity from multiple sources is utilized. Accordingly, determining what features to utilize from data from source A 202 and data from source B 203 is of importance in vertical federated learning.

Figure 3:
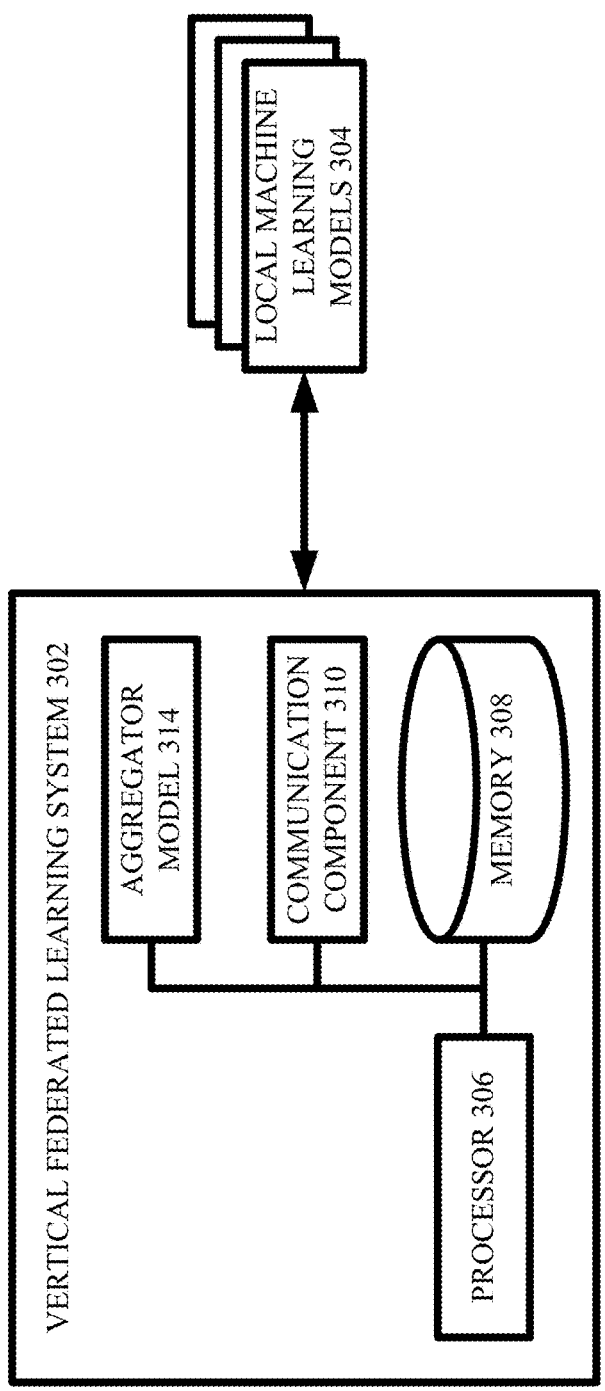
FIG. 3 illustrates block diagram of an example, non-limiting system that can facilitate feature selection in vertical federated learning in accordance with one or more embodiments described herein.

FIG. 3 illustrates block diagram of an example, non-limiting system 300 that can facilitate feature selection in vertical federated learning. Repetitive description of like elements employed in other embodiments described herein is omitted for sake of brevity. Aspects of systems (e.g., system 302 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, e.g., computers, computing devices, virtual machines, etc. can cause the machines to perform the operations described. System 302 can comprise aggregator machine learning model 314, communication component 310, one or more local machine learning models 304, processor 306 and memory 308.

In various embodiments, vertical federated learning system 302 can comprise a processor 306 (e.g., a computer processing unit, microprocessor) and a computer-readable memory 308 that is operably connected to the processor 306. The memory 308 can store computer-executable instructions which, upon execution by the processor, can cause the processor 306 and/or other components of the vertical federated learning system 302 (e.g., aggregator machine learning model 314, communication component 310 and/or one or more local machine learning models 304) to perform one or more acts. In various embodiments, the memory 308 can store computer-executable components (e.g., aggregator machine learning model 314, communication component 310 and/or one or more local machine learning models 304), the processor 306 can execute the computer-executable components. In various embodiments, the aggregator machine learning model 314 can be stored on a first server and the one or more local machine learning models 304 can be stored on one or more alternative servers.

According to some embodiments, the aggregator machine learning model 314 and/or the one or more local machine learning models 304 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the aggregator machine learning model 314 and/or the one or more local machine learning models 304 can employ principles of probabilistic and decision theoretic inference to determine one or more responses based on information retained in a knowledge source database. In various embodiments, the one or more local machine learning models 304 can employ individual and distinct knowledge source databases. For example, a first local machine learning model can employ a first knowledge source database and a second local machine learning model can employ a second knowledge source database. Furthermore, the aggregator machine learning model can employ a knowledge source database comprising embedding outputs generated by the one or more local machine learning models 304. Additionally or alternatively, aggregator machine learning model 314 and/or the one or more local machine learning models 304 can rely on predictive models constructed using machine learning and/or automated learning procedures. Logic-centric inference can also be employed separately or in conjunction with probabilistic methods. For example, decision tree learning can be utilized to map observations about data retained in a knowledge source database to derive a conclusion as to a response to a question.

As used herein, the term "inference" refers generally to the process of reasoning about or inferring states of the system, a component, a module, the environment, and/or assessments from one or more observations captured through events, reports, data, and/or through other forms of communication. Inference can be employed to identify a specific context or action, or can generate a probability distribution over states, for example. The inference can be probabilistic. For example, computation of a probability distribution over states of interest can be based on a consideration of data and/or events. The inference can also refer to techniques employed for composing higher-level events from one or more events and/or data. Such inference can result in the construction of new events and/or actions from one or more observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with automatic completion of one or more assessments associated with a target entity through the utilization of various structured and/or unstructured electronic data) can employ various artificial intelligence-based schemes for carrying out various aspects thereof. For example, a process for evaluating one or more parameters of a target entity can be utilized to predict one or more responses to the assessment, without interaction from the target entity, which can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to prognose or infer an action that should be employed to make a determination. The determination can include, but is not limited to whether to select a first assessment instead of a second assessment from an assessment database and/or whether a question presented in the selected assessment is similar to another question in an assessment previously completed. Another example includes whether, in the absence of specific information about the target entity, data from another target entity or a group of target entities can be utilized (which can impact a confidence score). In the case of automatic completion of assessments, for example, attributes can be identification of a target entity based on historical information and the classes can be related answers, related conditions, and/or related diagnoses.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording target entity behavior, by receiving extrinsic information, and so on). For example, SVM's can be configured through a learning phase or a training phase within a classifier constructor and feature selection module. Thus, a classifier(s) can be used to automatically learn and perform a number of functions, including but not limited to, determining according to a defined criteria a relevant assessment based on a given set of characteristics of a target entity. Further to this example, the relevant assessment can be selected from a multitude of assessments. Another function can include determining one or more responses to the assessment in view of information known about the target entity and assigning confidence scores to the responses. The criteria can include, but is not limited to, historical information, similar entities, similar subject matter, and so forth.

Additionally or alternatively, an embodiment scheme (e.g., a rule, a policy, and so on) can be applied to control and/or regulate an embodiment of automatic selection and/or completion of assessments before, during, and/or after a computerized assessment process. In some embodiments, based on a defined criterion, the rules-based embodiment can automatically and/or dynamically interpret how to respond to a particular question and/or one or more questions. In response thereto, the rule-based embodiment can automatically interpret and carry out functions associated with formatting the response or one or more responses based on an electronic format for receipt of the responses by employing a defined and/or programmed rule(s) based on any desired criteria.

In one or more embodiments, local machine learning models 304 can receive as input data sets from different sources. For example, a first local machine learning model can receive a first data set from a first source and a second local machine learning model can receive a second data set from a second source, wherein the first data set and the second data set are distinct. The local machine learning models can be trained to produce embedding vectors from the input data, wherein the embedding vectors comprise one or more embedding components. For example, a first local machine learning model of the local machine learning models 304 can output a first embedding vector and the second local machine learning model of the local machine learning model can output a second embedding vector. In a further embodiment, the local machine learning models 304 can send the embedding vectors to an aggregator model 314 via communication component 310.

Aggregator model 314 can aggregate the plurality embedding vectors from the local machine learning models 304 to utilize as training data to train aggregator model 314 to output an inference or prediction. For example, aggregator model 314 can be trained to make an inference or prediction about a sample, based on the embedding vectors aggregated from the one or more local machine learning models. Accordingly, aggregator model 314 can be trained based on data from the different data sources (e.g., the input data to the local machine learning models 304) without directly sharing the data from the different data sources, thereby offering better data protection and security. However, some embedding components may have little or no impact on aggregator model 314 accuracy. Accordingly, aggregator model 314 can remove one or more embedding components in order decrease the number of computations performed by aggregator model 314, and thus improve the speed and/or performance of aggregator model 314. In an embodiment, aggregator model 314 can remove one or more embedding components from the plurality of embedding components based on minimizing weights at an input layer of the aggregator machine learning model. For example, aggregator model 314 can solve an optimization problem that minimizes weights of embedding components and compares the loss in performance from the minimization to the previous performance of the aggregator model 314, to determine minimized weights of embedding components that do not negative impact aggregator model's 314 accuracy. The lower the weight of an embedding component, the lower impact the embedding component has on the output and/or accuracy of the aggregator model 314. Accordingly, embedding components with low weights (e.g., weights within a defined threshold value of 0) can be removed by aggregator model 314, without impacting the accuracy of aggregator model 314.

In an embodiment, the optimization problem can be defined as $$\min_{\theta_0} l(\theta_0, h(\theta'_1), \ldots, h(\theta'_M)) + \lambda \sum_{k=1}^{K} \|W_k^1\|_2,$$

wherein M is the number of local machine learning models, $h(\theta_M)$ is the one or more embedding vectors of the $M^{th}$ machine learning model, K is a sum of lengths of the one or more embedding vectors, $W_k^1$ is the $k^{th}$ group of weights at the input layer of the aggregator machine learning model, $\theta_0$ is the aggregator models weights, l is a loss function and $\lambda$ is a regularization coefficient. In an embodiment, $\lambda$ can be adjusted to increase or decrease the minimized weights. For example, a relatively large $\lambda$ will result in relatively low weights, leading to more embedding components being removed while a relatively small $\lambda$ will result in relatively high weights leading to fewer embedding components being removed.

In a further embodiment, communication component 310 can notify local machine learning models 304 of the removal of the one or more embedding components. For example, if aggregator model 314 removes an embedding component from the embedding vector produced by a first local machine learning model of the local machine learning models 304, communication component 310 can notify the first local machine learning model of the removal. The local machine learning models 304 can then remove one or more features based on the removal of the one or more embedding components by the aggregator model 314. In an embodiment, the local machine learning models 304 can remove the one or more features by minimizing weights at input layers of the local machine learning models 304, wherein the minimizing comprises an optimization problem.

For example, the local machine learning models 304 can solve an optimization problem that minimizes weights of input features while maintaining a similar embedding vector output (e.g., within a distance metric), to the original embedding output, minus the one or more removed embedding components, to determine minimized weights of input features that do not impact the embedding output of the local machine learning models 304. Accordingly, features with low weights (e.g., weights within a defined threshold value of 0) can be removed by local machine learning models 304 to generate updated input features.

In an embodiment, the optimization problem can be defined as $$\min_{\theta} \|h(\theta')\kappa - h(\theta)\kappa\|_2^2 + \lambda \sum_{d=1}^{D} \|W_d^1\|_2,$$

wherein D is the number of features input to the local machine learning model, $h(\theta')$ is the original embedding output of the local machine learning model, K is the set of remaining embedding components, Wd is the $d^{th}$ group of weights at the input layer of the local machine learning model and $\lambda$ is a regularization coefficient. It should be appreciated that individual local models of the local machine learning models 304 can individually solve the optimization problem to remove features from their respective input features.

In an embodiment, local machine learning models 304 can be retrained on the respective updated input feature sets. The updated output embedding vectors can then be transmitted to the aggregator model 314, via communication component 310, and the aggregator model 314 can be retrained utilizing the updated embedding vectors as training data. In a further embodiment, local machine learning models 304 can determine a distance metric between the previously output embedding vectors, and the updated embedding vectors generated after removal of one or more features. It should be appreciated that vertical federated learning system 302 can cycle through the feature selection process for multiple iterations. For example, after retraining on the updated embedding vectors, aggregator model 314 can again remove one or more embedding components, and the local machine learning models 304 can again remove one or more features. In an embodiment, this cycle can continue for a set number of iterations, a set amount of time, and/or until accuracy of the aggregator model 314 is greater or equal to an accuracy threshold value.

Figure 4:
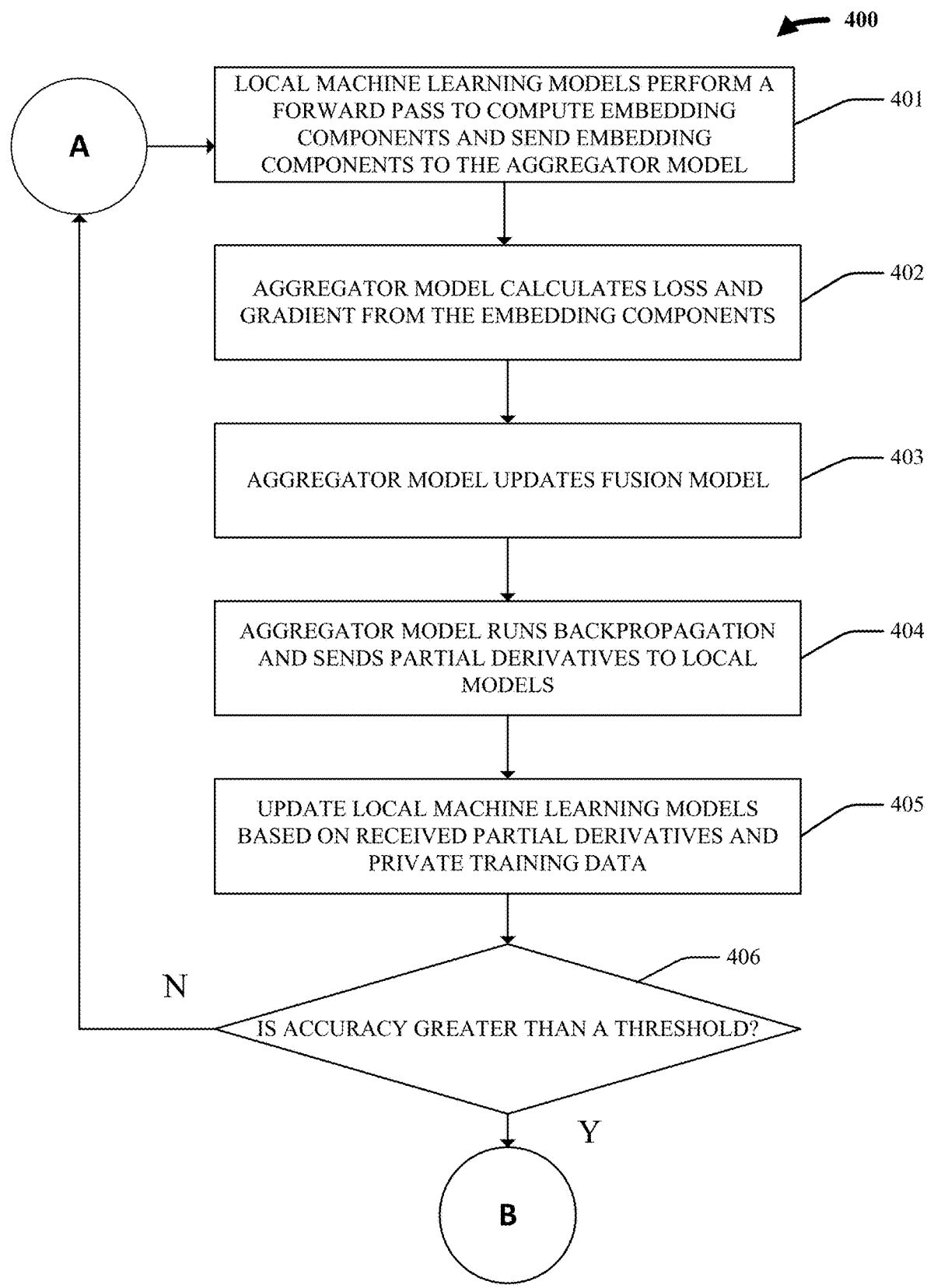
FIG. 4 illustrates a flow diagram of an example, non-limiting first stage of a computer-implemented method that can facilitate feature selection in vertical federated learning in accordance with one or more embodiments described herein.

FIG. 4 illustrates a flow diagram of an example, non-limiting first stage of a computer-implemented method that can facilitate feature selection in vertical federated learning in accordance with one or more embodiments described herein.

At 401, method 400 can comprise performing, by one or more local machine learning models, a forward pass to compute a plurality embedding vectors from input features and sending the plurality of embedding vectors to an aggregator machine learning model.

At 402, method 400 can comprise calculating, by the aggregator model loss and gradients from the plurality of embedding components.

At 403, method 400 can comprise updating the aggregator model based on the calculated loss and gradients.

At 404, method 400 can comprise running, by the aggregator model, backpropagation to calculate partial derivatives and sending the partial derivatives to the one or more local machine learning models.

At 405, method 400 can comprise updating the one or more local machine learning models based on the received partial derivatives and private training data of the one or more local machine learning models.

At 406, method 400 can comprise determining if the accuracy of the aggregator model is greater or equal to a threshold. For example, the accuracy of the aggregator model can be measured in a metric such as an F1 score. If the score of the aggregator model is greater or equal to the threshold score, method 400 can proceed to step 501 of method 500 described in greater detail below. If the score of the aggregator model is below the threshold, method 400 can return to step 401 to perform an additional training cycle.

Figure 5:
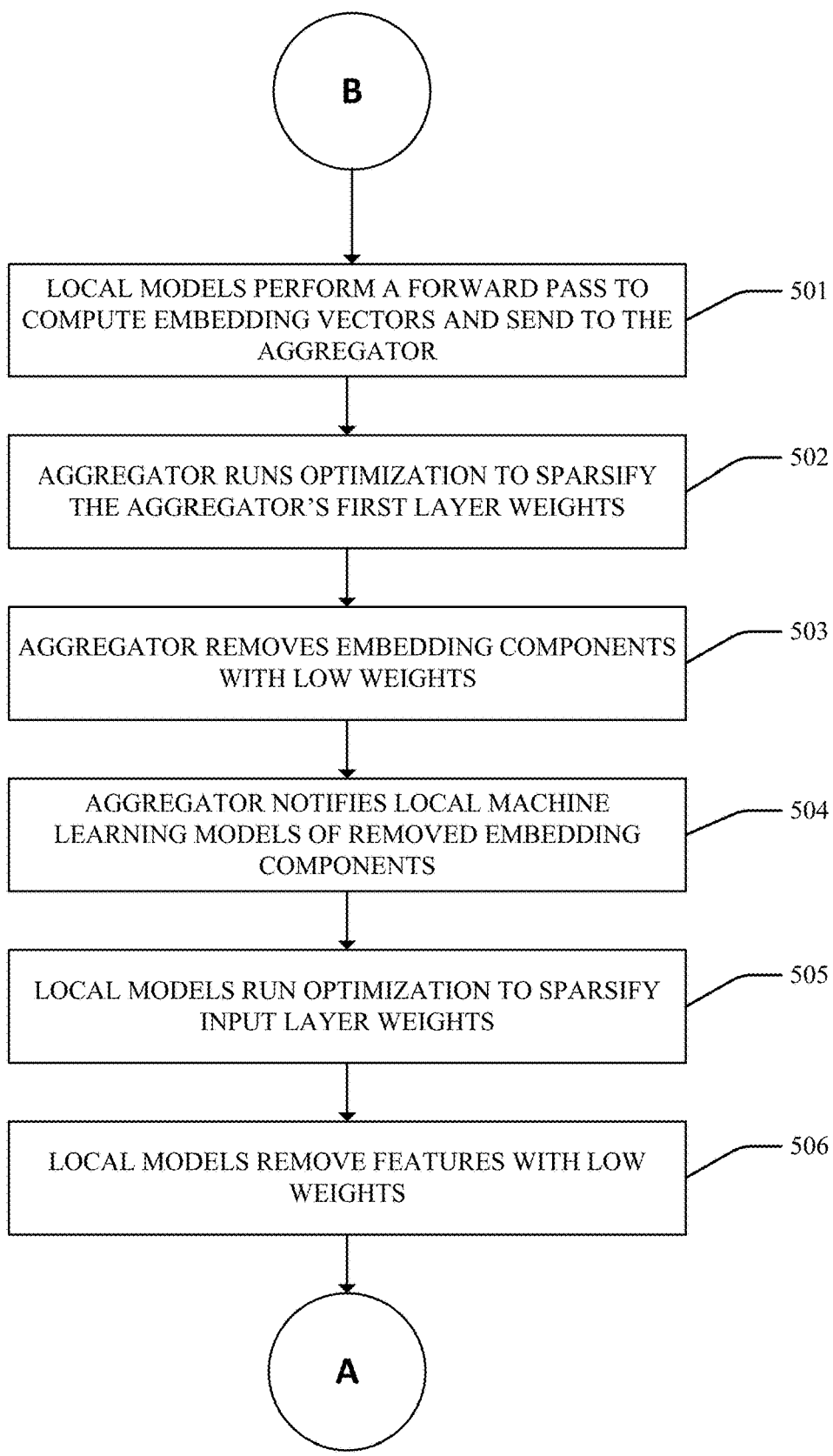
FIG. 5 illustrates a flow diagram of an example, non-limiting second stage of a computer-implemented method that can facilitate feature selection in vertical federated learning in accordance with one or more embodiments described herein.

FIG. 5 illustrates a flow diagram of an example, non-limiting second stage of a computer-implemented method that can facilitate feature selection in vertical federated learning in accordance with one or more embodiments described herein.

At 501, method 500 can comprise performing, by one or more local machine learning models, a forward pass to compute a plurality of embeddings from input features and sending the plurality of embeddings to an aggregator machine learning model.

At 502, method 500 can comprise running, by the aggregator model, an optimization problem to sparsify the aggregator model's first layer weights. For example, the aggregator model can solve and optimization problem to minimize weights of plurality of embeddings.

At 503, method 500 can comprise removing, by the aggregator model, embeddings with low weights. For example, in some embodiments, the embedding of the plurality of embeddings with the lowest weight can be removed. In another embodiment, the aggregator model can compare the weights to a threshold, and embeddings with a weight below the threshold can be removed.

At 504, method 500 can comprise notifying, by the aggregator, the local machine learning models of the removed embeddings.

At 505, method 500 can comprise running, by the local machine learning models, an optimization problem to sparsify the local machine learning models' input layer weights. For example, the local machine learning models can solve optimization problems to minimize the weights of features at the input layers.

At 506, method 500 can comprise removing, by the local machine learning models, features with low weights. For example, in some embodiments, the feature or features with the lowest weight can be removed. In another embodiment, the local machine learning models can compare the weights to a threshold, and features with weights below the threshold can be removed. Method 500 can then return to step 401 of method 400 to retrain the local machine learning models and the aggregator model based on the removal of features at 506.

Figure 6:
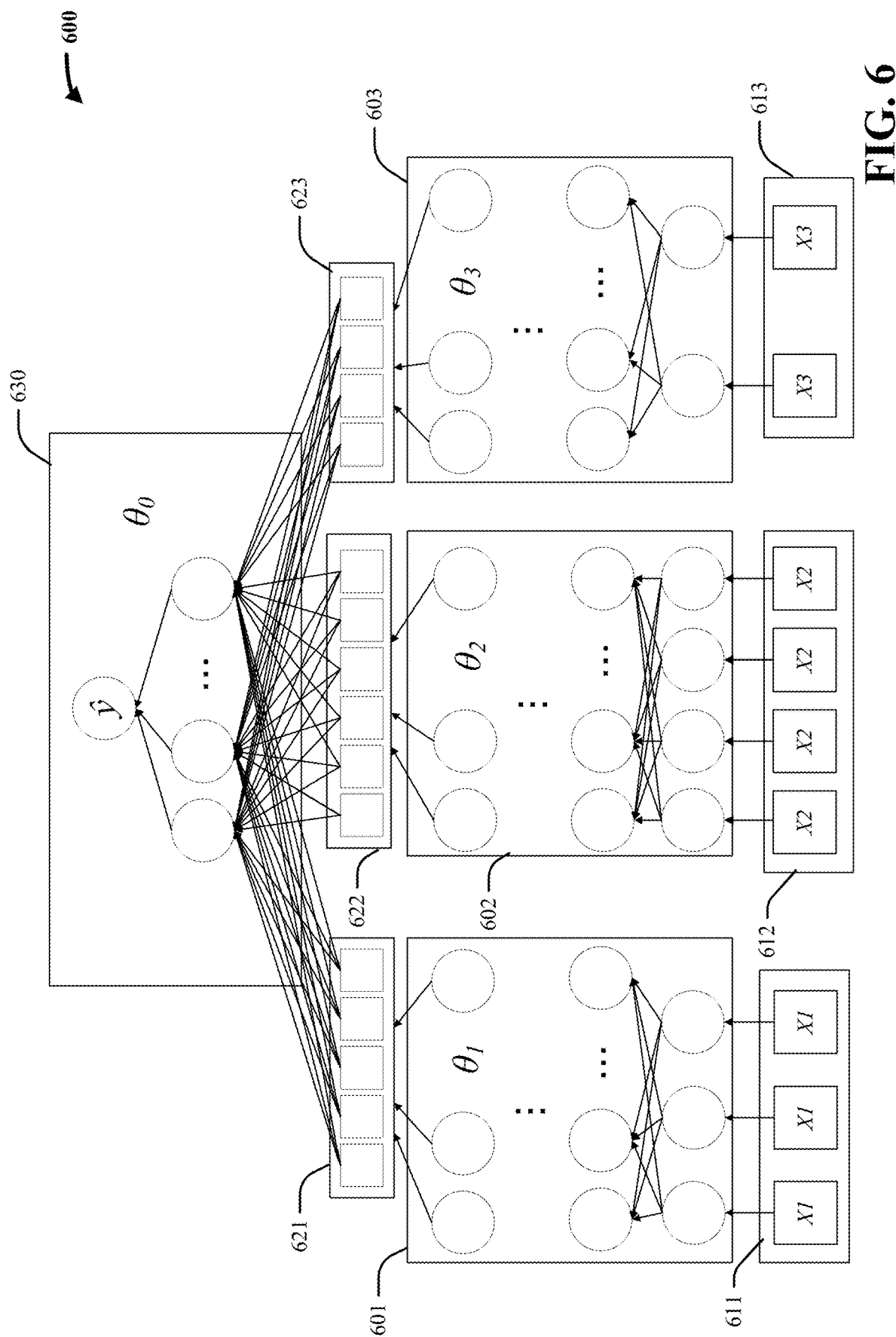
FIG. 6 illustrates a non-limiting block diagram of a first stage of vertical federated learning in accordance with one or more embodiments described herein.

FIG. 6 illustrates a non-limiting block diagram 600 of a first stage of vertical federated learning in accordance with one or more embodiments described herein.

As shown, diagram 600 comprises first local machine learning model 601, second local machine learning model 602, and third local machine learning model 603. First local machine learning model 601, second local machine learning model 602, and third local machine learning model 603 can respectively receive first feature set 611, second feature 612, and third feature set 613 and generate respectively first embedding vector 621, second embedding vector 622, and third embedding vector 623. Aggregator model 630 can aggregate first embedding vector 621, second embedding vector 622, and third embedding vector 623 to form a plurality of embedding components that can be utilized as training input for aggregator model 630. In order to facilitate feature selection, aggregator model 630 can minimize weights at the input layer of the aggregator model 630 by solving an optimization problem. In an embodiment, the optimization problem can be defined as $$\min_{\theta_0} l(\theta_0, h(\theta'_1), \ldots, h(\theta'_M)) + \lambda \sum_{k=1}^{K} \|W_k^1\|_2,$$

wherein M is the number of local machine learning models, $h(\theta_M)$ is the one or more embedding vectors of the $M^{th}$ machine learning model, K is a sum of lengths of the one or more embedding vectors, $W_k^1$ is the $k^{th}$ group of weights at the input layer of the aggregator machine learning model, $\theta_0$ is the aggregator models weights, l is a loss function and $\lambda$ is a regularization coefficient. In an embodiment, $\lambda$ can be adjusted to increase or decrease the minimized weights. For example, a relatively large $\lambda$ will result in relatively low weights, leading to more embedding components being removed while a relatively small $\lambda$ will result in relatively high weights leading to fewer embedding components being removed. Accordingly, for diagram 600, M=3, K=16, $h(\theta_1)$ is first embedding vector 621, $h(\theta_2)$ is second embedding vector 622 and $h(\theta_3)$ is third embedding vector 613.

Figure 7:
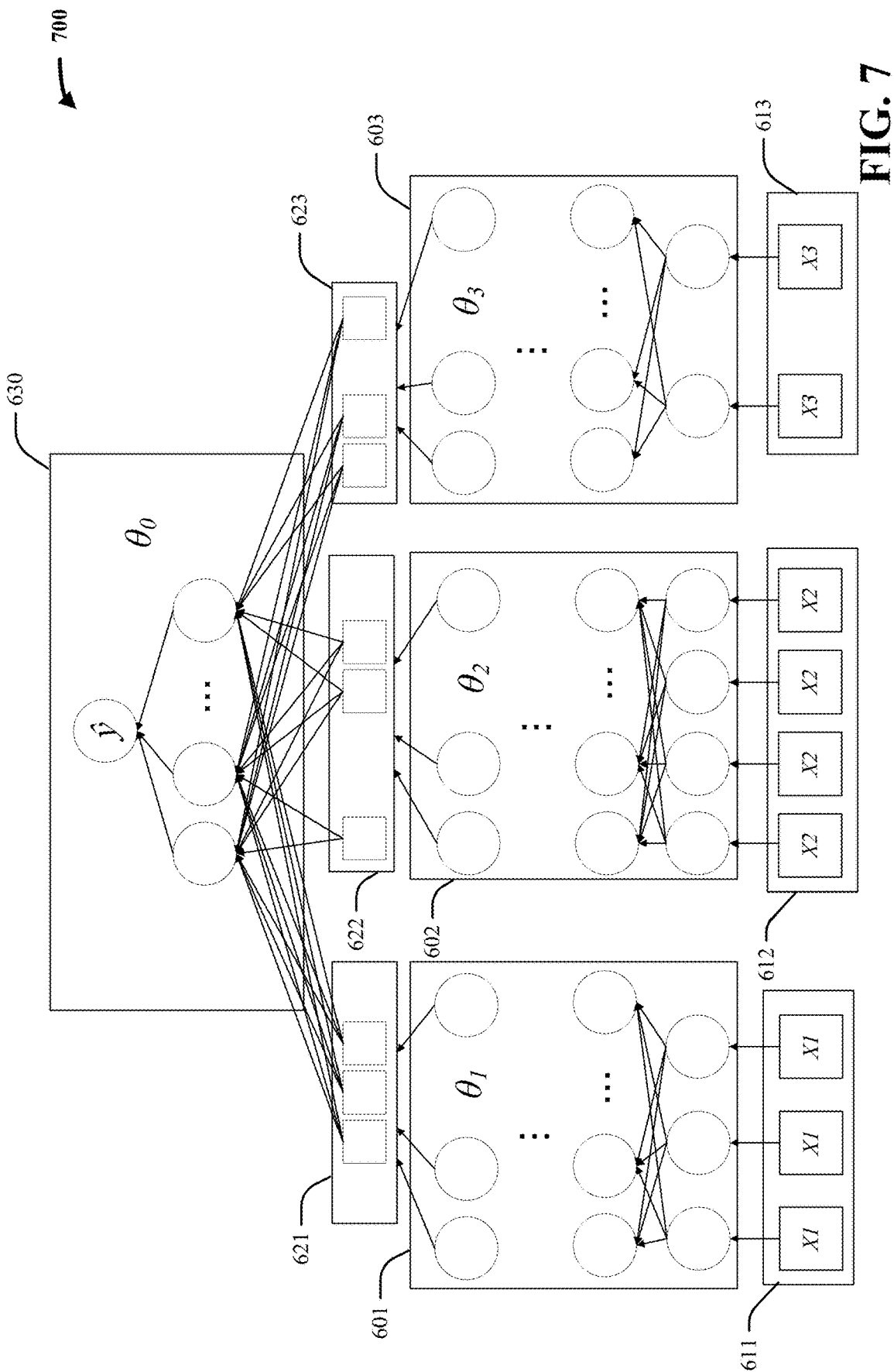
FIG. 7 illustrates a non-limiting block diagram of a second stage of vertical federated learning in accordance with one or more embodiments described herein.

FIG. 7 illustrates a non-limiting block diagram 700 of a second stage of vertical federated learning in accordance with one or more embodiments described herein.

As described above in reference to FIG. 6, weights can be calculated for first embedding vector 621, second embedding vector 622, and third embedding vector 623. As components with small weights (e.g., close to zero) will have little to no effect on the aggregator model 630, these components can be removed without negatively impacting aggregator model 630 performance. In an embodiment, aggregator model 630 can compare the weights to a threshold and remove embedding components with weights below the threshold. As shown in diagram 700, embedding components have been removed from first embedding vector 621, second embedding vector 622, and third embedding vector 623. Aggregator model 630 can then notify first local machine learning model 601, second local machine learning model 602, and third local machine learning model 603 of the removed embedding components. First local machine learning model 601, second local machine learning model 602, and third local machine learning model 603 can then each solve and optimization problem to minimize weights at their respective input layers while maintaining similar performance. In an embodiment, the optimization problem can be defined as $$\min_\theta \|h(\theta')\kappa - h(\theta)\kappa\|_2^2 + \lambda \sum_{d=1}^{D} \|W_d^1\|_2,$$

wherein D is the number of features input to the local machine learning model, $h(\theta')$ is the original embedding output of the local machine learning model, K is the set of remaining embedding components, Wd is the $d^{th}$ group of weights at the input layer of the local machine learning model and $\lambda$ is a regularization coefficient.

Figure 8:
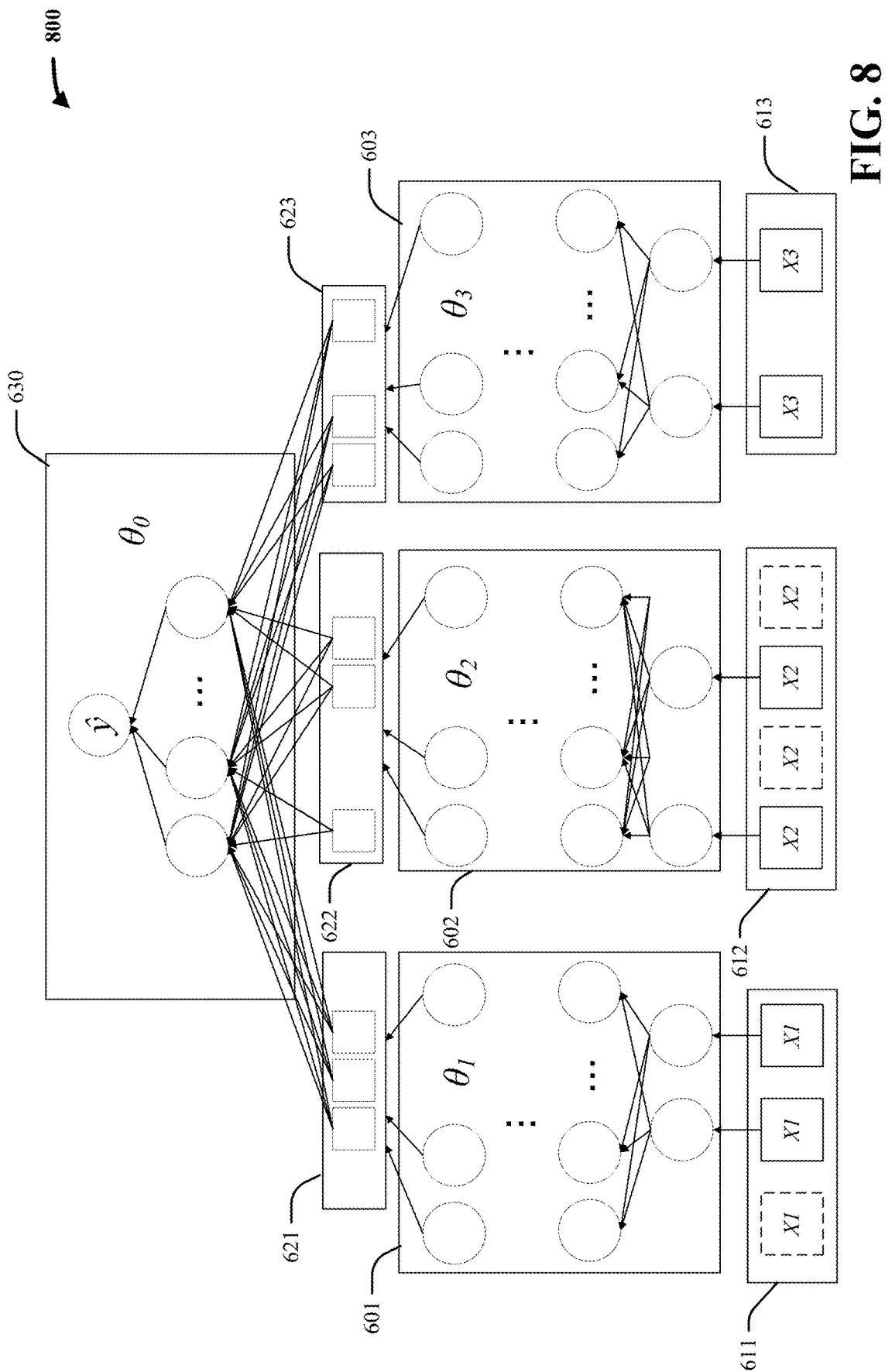
FIG. 8 illustrates a non-limiting block diagram of a third stage of vertical federated learning in accordance with one or more embodiments described herein.

FIG. 8 illustrates a non-limiting block diagram 800 of a third stage of vertical federated learning in accordance with one or more embodiments described herein.

First local machine learning model 601, second local machine learning model 602, and third local machine learning model 603 can compare the weights calculated above in reference to FIG. 6 to a threshold and remove features associated with weights below the threshold. Therefore, features that have little impact on the embedding output (e.g., features with low weights) can be removed with little to no negative impact on local machine learning model performance. As shown in diagram 800, first local machine learning model 601 has removed a feature from first feature set 611 and second local machine learning model 602 has removed two features from second feature set 612.

Figure 9B:
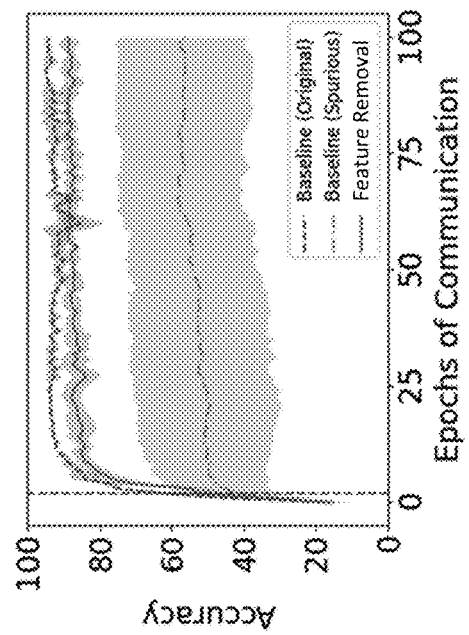
FIGS. 9A, 9B, 9C and 9D illustrate graphs comparing the performance of various vertical federated learning model in accordance with one or more embodiments described herein.
Figure 9D:
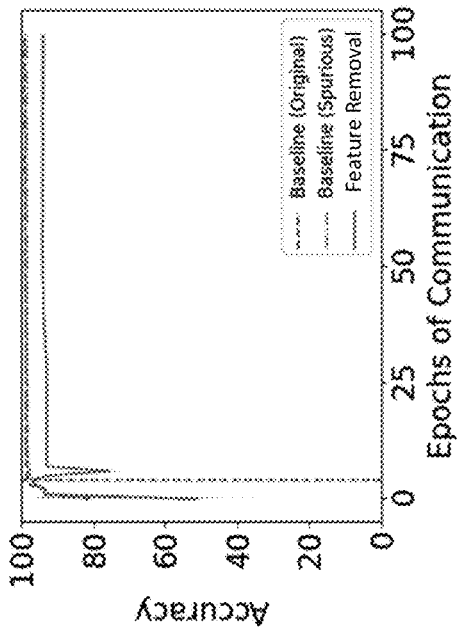
Figure 9A:
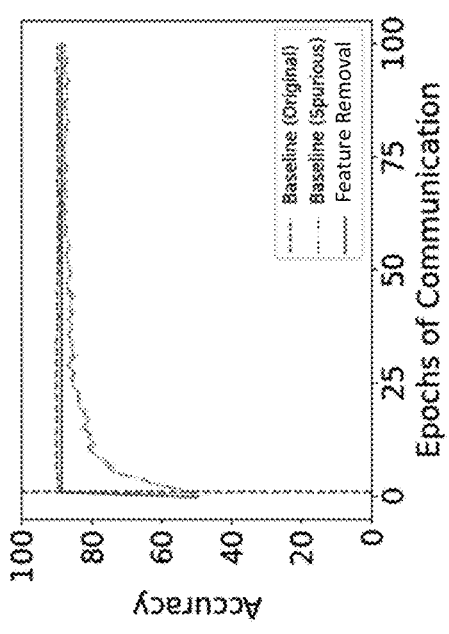
Figure 9C:
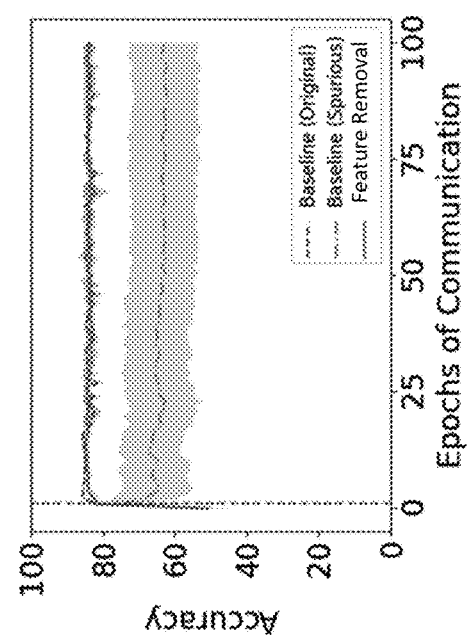

FIGS. 9A, 9B, 9C and 9D illustrate graphs comparing the performance of various vertical federated learning model in accordance with one or more embodiments described herein. FIGS. 9A, 9B, 9C and 9D illustrate the performance of a vertical federated learning system with idealized features, a vertical federated learning system with spurious features, and a vertical federated learning system utilizing the feature selection described herein. The y-axis of FIGS. 9A, 9B, 9C and 9D represents accuracy of the models and the x-axis represents epochs of communications (e.g., number of training cycles). FIG. 9A shows performance utilizing binary classification data set of medical data, FIG. 9B shows performance utilizing a multi-class classification data set of time-series positional data, FIG. 9C shows performance utilizing a binary classification data set of handwritten digits, and FIG. 9D illustrates a binary classification data set of a forest cover type. As shown by FIGS. 9A, 9B, 9C and 9D, the described feature selection method offers performance (e.g., accuracy) comparable to learning systems utilizing idealized manually selected features.

Figures 10A, 10B:
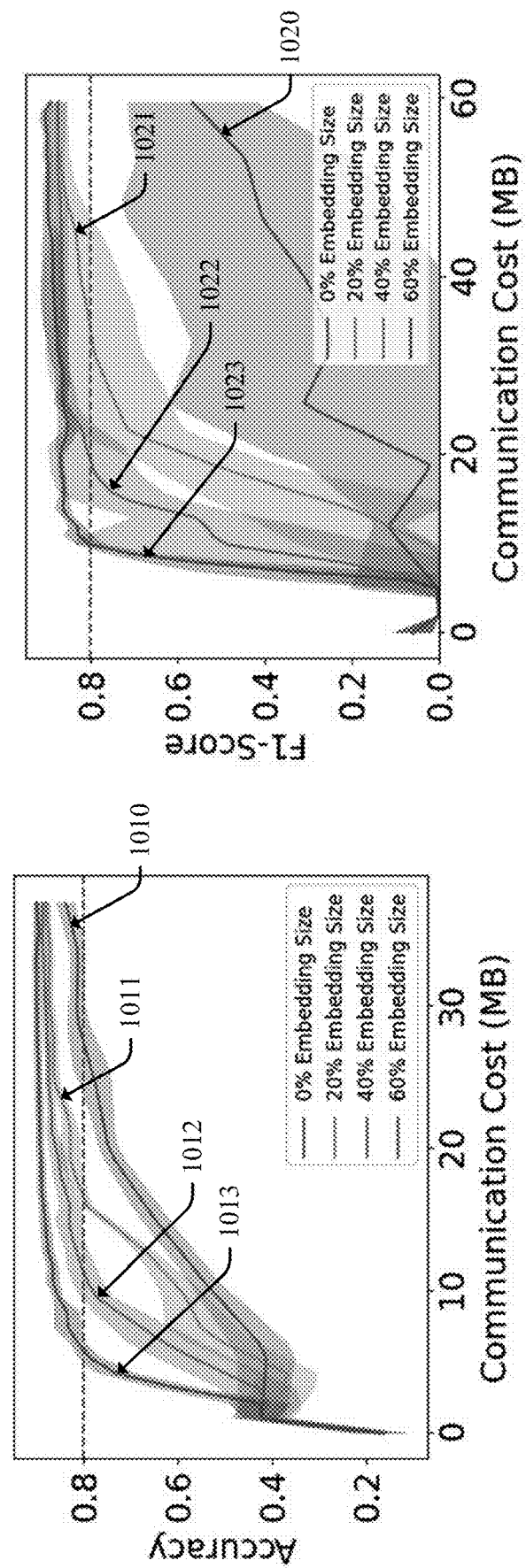
FIGS. 10A and 10B illustrate graphs showing the correlation between reduction in communication cost and reduction in embedding components of vertical federated learning systems utilizing feature selection in accordance with one or more embodiments described herein.

FIGS. 10A and 10B illustrate graphs showing the correlation between reduction in communication cost and reduction in embedding components of vertical federated learning systems utilizing feature selection in accordance with one or more embodiments described herein.

The y-axis of FIGS. 10A and 10B shows accuracy (measured as F1-score) and the x-axis shows communication cost between the aggregator machine learning model and the one or more local machine learning models. The percentages of the various lines shown in FIGS. 10A and 10B represent the percentage of embedding components removed utilizing the method described herein. For example, line 1010 of FIG. 10A and line 1020 of FIG. 10B represent performance with no embeddings removed, line 1011 of FIG. 10A and line 1021 of FIG. 10B represent performance with 20% of embeddings removed, line 1012 of FIG. 10A and line 1022 of FIG. 10B represent performance with 40% of embeddings removed, and line 1013 of FIG. 10A and line 1023 of FIG. 10B represent performance with 60% of embeddings removed. Accordingly, as shown by both FIGS. 10A and 10B, the utilization the feature selection method described herein can both improve accuracy of the aggregator machine learning model and reduce the amount of data transmitted between the aggregator machine learning model and the one or more local machine learning models.

Figure 11:
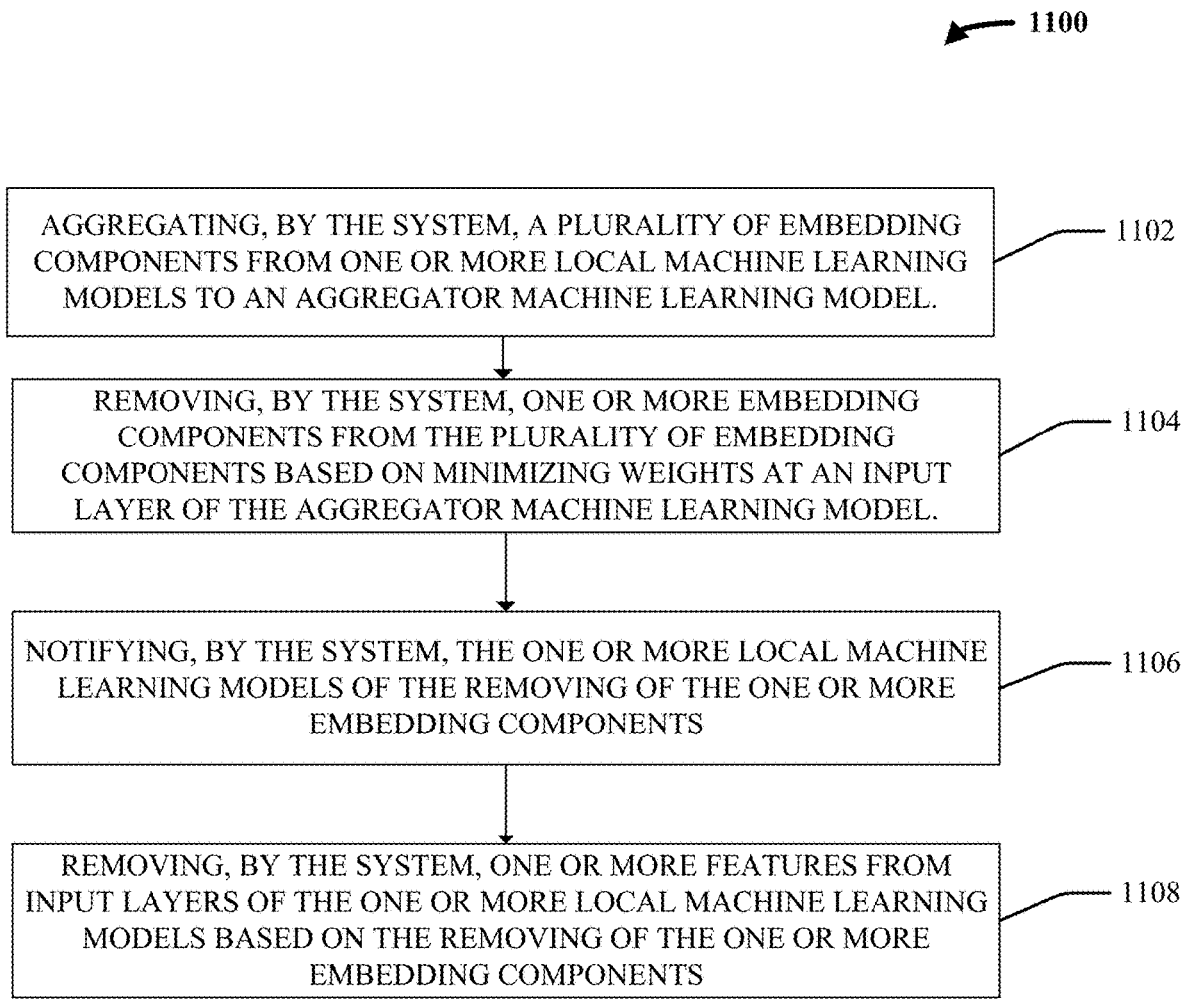
FIG. 11 illustrates a flow diagram of an example, non-limiting computer implemented method that can facilitate feature selection in vertical federated learning in accordance with one or more embodiments described herein.

FIG. 11 illustrates a flow diagram of an example, non-limiting, computer-implemented method 1100 that can facilitate feature selection in vertical federated learning in accordance with one or more embodiments described herein. Repetitive description of like elements employed in other embodiments described herein is omitted for sake of brevity.

At 1102, method 1100 can comprise aggregating, by a system (e.g., vertical federated learning system 302 and/or aggregator model 314) operatively coupled to a processor (e.g., processor 306) a plurality of embedding components from one or more local machine learning models to an aggregator machine learning model.

At 1104, method 1100 can comprise removing, by the system (e.g., vertical federated learning system 302 and/or aggregator model 314), one or more embedding components from the plurality of embedding components based on minimizing the weights at an input layer of the aggregator machine learning model. For example, the aggregator machine learning model can solve the optimization problem described in detail above in reference to FIG. 5 to minimize weights associated with embedding components and then remove embedding components with weights within a defined threshold value of 0.

At 1106, method 1100 can comprise notifying, by the system (e.g., vertical federated learning system 302 and/or communication component 310), the one or more local machine learning models of the removing of the one or more embedding components.

At 1108, method 1100 can comprise removing, by the system (e.g., vertical federated learning system 302 and/or local machine learning models 304), one or more features from input layers of the one or more local machine learning models based on the removing of the one or more embedding components. For example, the one or more local machine learning models can solve the optimization problem described in detail above in reference to FIGS. 6-7 to identify and remove features with low weights.

Figure 12A:
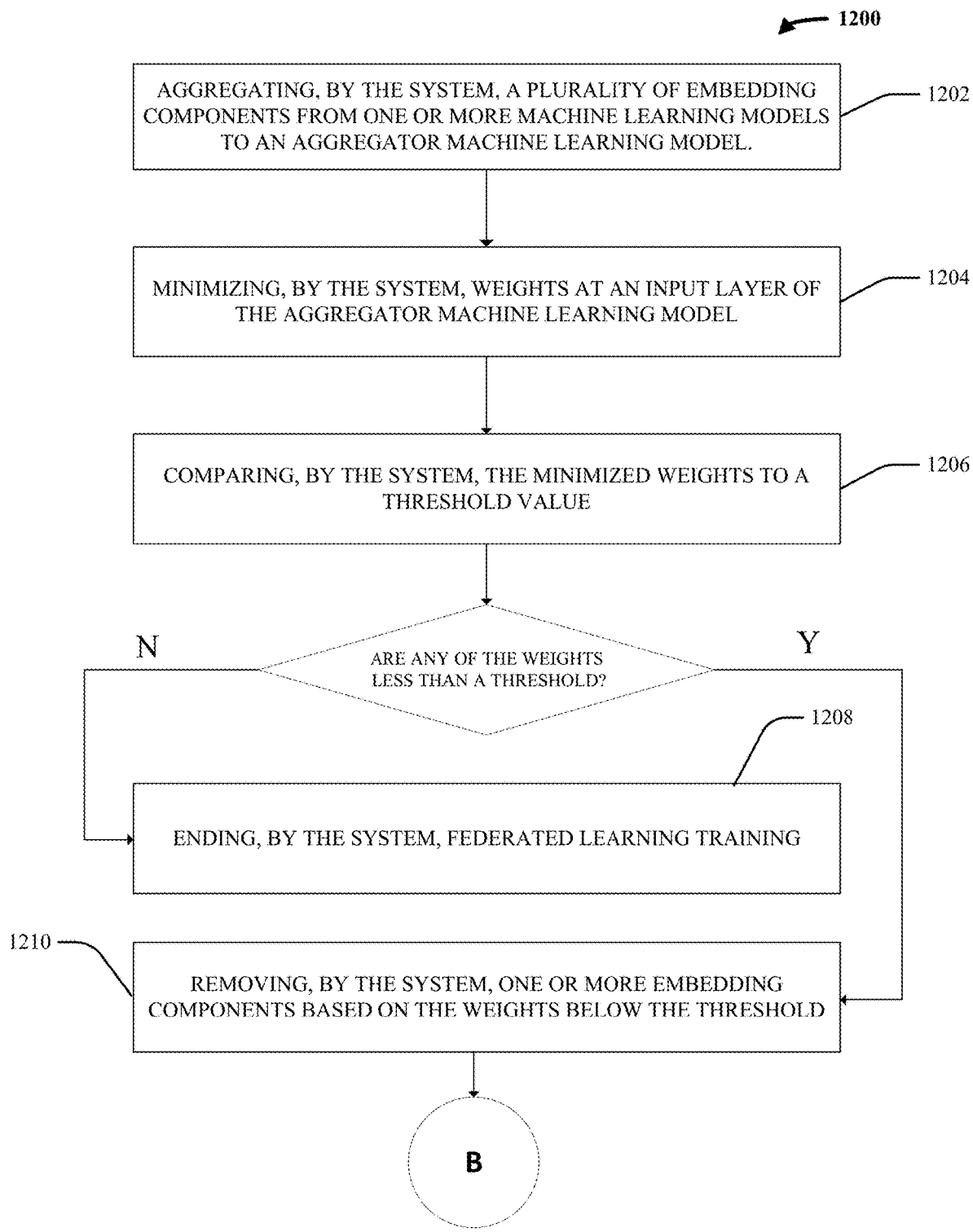
FIGS. 12A and 12B illustrates a flow diagram of an example, non-limiting computer implemented method that can facilitate feature selection in vertical federated learning in accordance with one or more embodiments described herein.
Figure 12B:
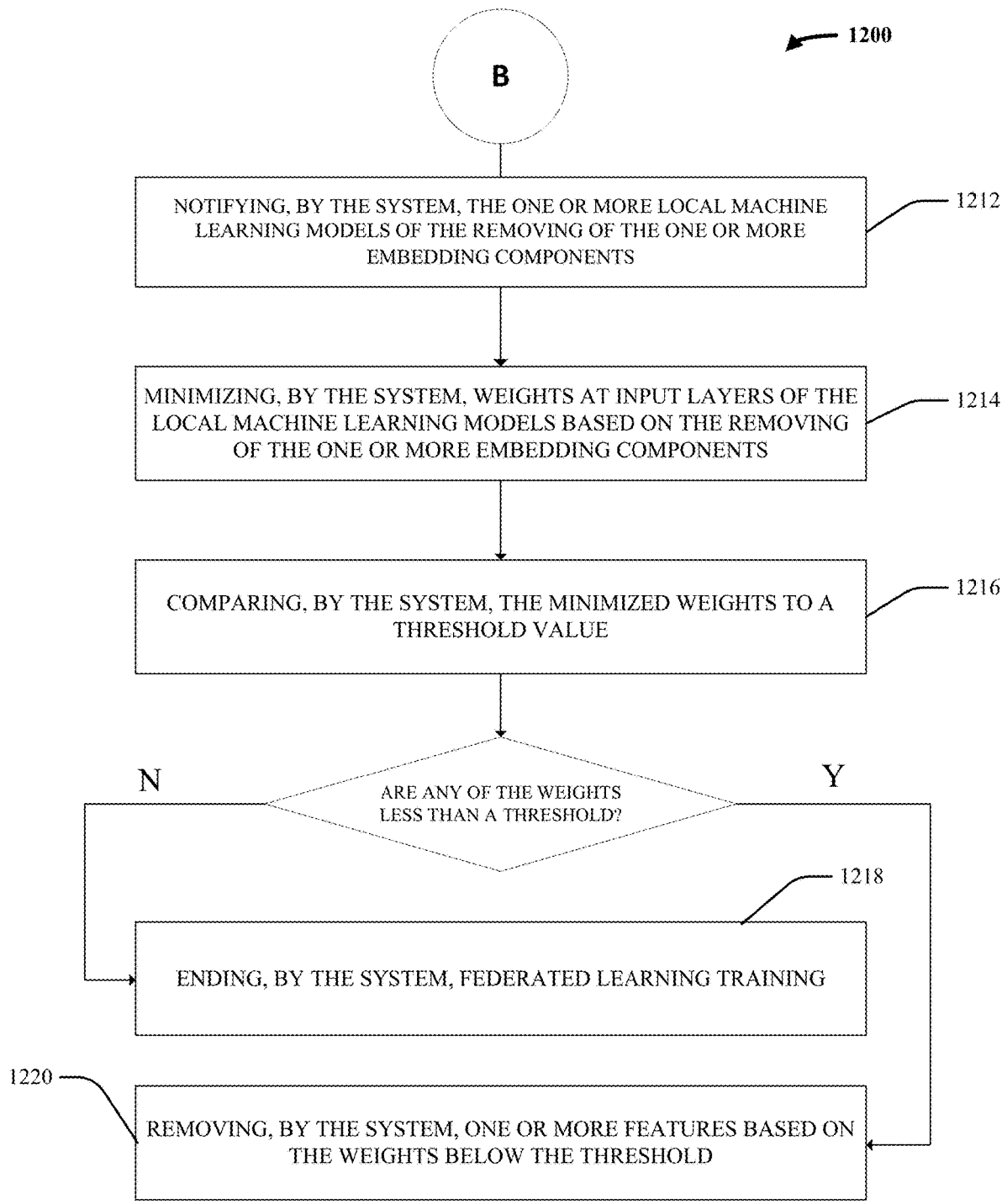

FIGS. 12A and 12B illustrates a flow diagram of an example, non-limiting, computer-implemented method 1200 that can facilitate feature selection in vertical federated learning in accordance with one or more embodiments described herein. Repetitive description of like elements employed in other embodiments described herein is omitted for sake of brevity.

At 1202, method 1200 can comprise aggregating, by a system (e.g., vertical federated learning system 302 and/or aggregator model 314) operatively coupled to a processor (e.g., processor 306) a plurality of embedding components from one or more local machine learning models to an aggregator machine learning model.

At 1304, method 1200 can comprise minimizing, by the system (e.g., vertical federated learning system 302 and/or aggregator model 314), weights at an input layer of the aggregator machine learning model. For example, the aggregator machine learning model can solve the optimization problem described in detail above in reference to FIG. 5 to minimize weights associated with embedding components.

At 1206, method 1200 can comprise comparing, by the system (e.g., vertical federated learning system 302 and/or aggregator model 314), the minimized weights to a threshold value. If any weights are less than the threshold value (e.g., with a defined range of 0), method 1200 can proceed to step 1210. If no weights are less than the threshold value, then method 1200 can proceed to step 1208 and end training.

At 1210, method 1200 can comprise removing, by the system (e.g., vertical federated learning system 302 and/or aggregator model 314), one or more embedding components based on the weights determined to be below the threshold value at step 1206.

At 1212, method 1200 can comprise, notifying, by the system (e.g., vertical federated learning system 302 and/or communication component 310), the one or more local machine learning models of the removing of the one or more embedding components.

At 1214, method 1200 can comprise, minimizing, by the system (e.g., vertical federated learning system 302 and/or local machine learning models 304), weights at input layers of the local machine learning models based on the removing of the one or more embedding components. For example, the one or more local machine learning models can solve the optimization problem described in detail above in reference to FIGS. 6-7 to minimize weights associated with features input to the local machine learning models.

At 1216, method 1200 can comprise comparing, by the system (e.g., vertical federated learning system 302 and/or local machine learning models 304), the minimized weights to a threshold value. If any weights are less than the threshold value (e.g., with a defined range of 0), method 1200 can proceed to step 1220. If no weights are less than the threshold value, then method 1200 can proceed to step 1218 and end training.

At 1220, method 1200 can comprise removing, by the system (e.g., vertical federated learning system 302 and/or local machine learning models 304), one or more features from the inputs of the one or more local machine learning models based on the weights determined to be below the threshold. In a further embodiment, the one or more local machine learning models can be retrained using the reduced set of features as input.

Vertical federated learning system 302 can provide technological improvements to systems, devices, components, operation steps, and/or processing steps associated with vertical federated learning. For example, vertical federated learning system 302 can remove unimportant embedding components and/or input features, thereby improving performance of aggregator model 314.

Vertical federated learning system 302 can provide technical improvements to a processing unit associated with vertical federated learning system 302. For example, by removing embedding components during training of the aggregator model 314, the amount of communication called for between the aggregator model 314 and the local machine learning models 304 is reduced, thereby reducing the workload of a processing unit (e.g., processor 306) that is employed to execute routines (e.g., instructions and/or processing threads) involved in training aggregator model 314. In this example, by reducing the workload of such a processing unit (e.g., processor 306), vertical federated learning system 302 can thereby facilitate improved performance, improved efficiency, and/or reduced computational cost associated with such a processing unit. Further, by removing one or more embedding components, vertical federated learning system 302 decreases the amount of data transmitted between local machine learning models 304 and aggregator model 314 during training of aggregator model 314, thereby decreasing network traffic and improving network speed, thereby enabling vertical federated learning system 302 to operate over networks with reduced bandwidth.

A practical application of vertical federated learning system 302 is that it allows for training of aggregator model 314 utilizing a reduced amount of computing and/or network resources, in comparison to other methods.

It is to be appreciated that vertical federated learning system 302 can utilize various combination of electrical components, mechanical components, and circuitry that cannot be replicated in the mind of a human or performed by a human as the various operations that can be executed by vertical federated learning system 302 and/or components thereof as described herein are operations that are greater than the capability of a human mind. For instance, the amount of data processed, the speed of processing such data, or the types of data processed by vertical federated learning system 302 over a certain period of time can be greater, faster, or different than the amount, speed, or data type that can be processed by a human mind over the same period of time. According to several embodiments, vertical federated learning system 302 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that vertical federated learning system 302 can include information that is impossible to obtain manually by an entity, such as a human user. For example, the type, amount, and/or variety of information included in vertical federated learning system 302 can be more complex than information obtained manually by an entity, such as a human user.

Figure 13:
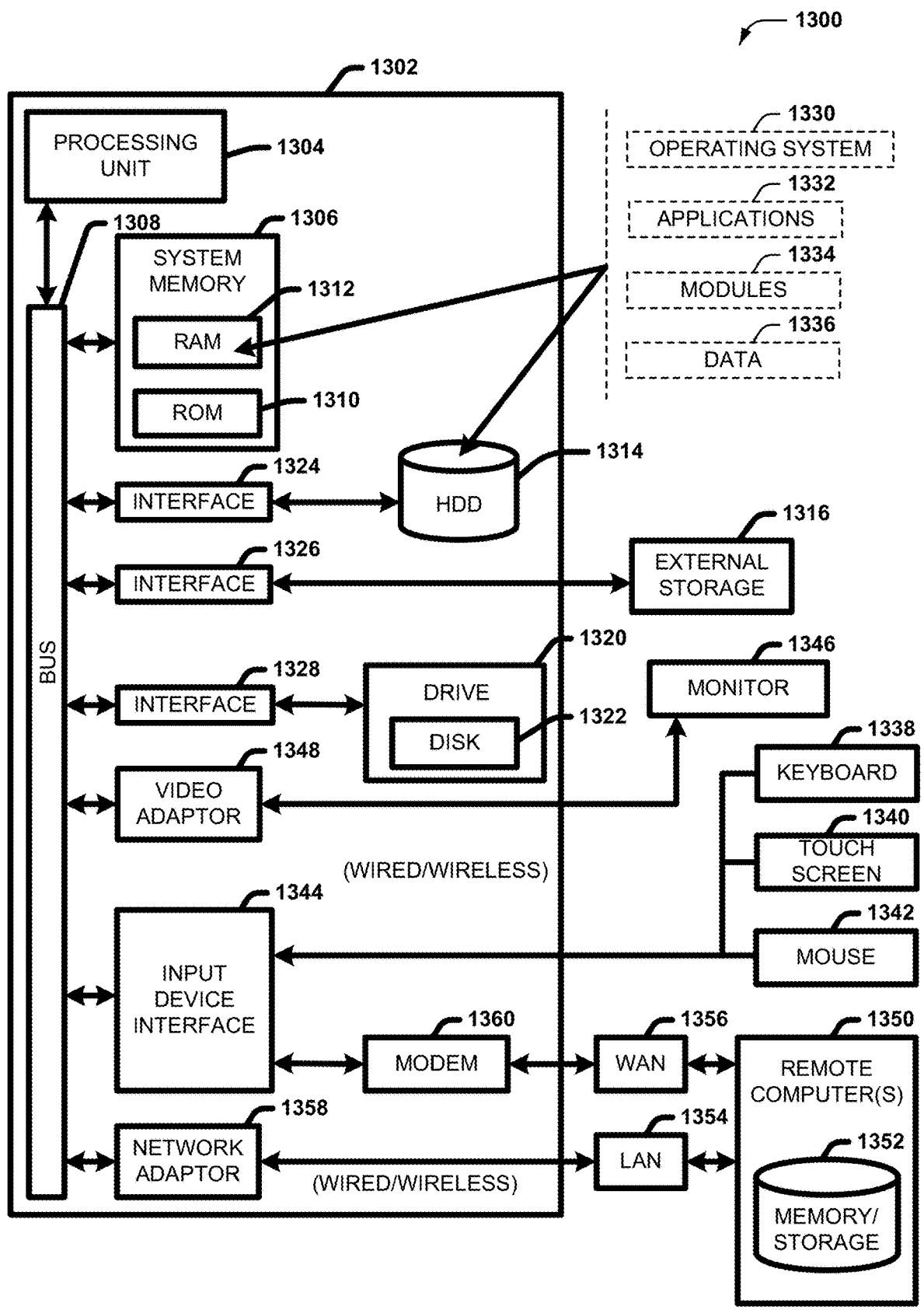
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:
1. A computer-implemented method comprising:
aggregating, by a system operatively coupled to a processor, a plurality of embedding components from one or more local machine learning models to an aggregator machine learning model; and
removing, by the system, one or more embedding components from the plurality of embedding components based on minimizing weights at an input layer of the aggregator machine learning model notifying, by the system, the one or more local machine learning models of the removing of the one or more embedding components;

removing, by the system, one or more features from input layers of the one or more local machine learning models based on the removing of the one or more embedding components;

wherein minimizing the weights further comprises solving, by the system, via the aggregator machine learning model, an optimization problem.

2. The computer-implemented method of claim 1, wherein the removing the one or more features from the input layers of the one or more local machine learning models further comprises minimizing weights at the input layers of the one or more local machine learning models.

3. The computer-implemented method of claim 2, wherein the minimizing weights at the input layers of the one or more local machine learning models further comprises solving, by the system, a second optimization problem.

4. The computer-implemented method of claim 3, wherein the second optimization problem is defined as $$\min_\theta \|h(\theta')\kappa - h(\theta)\kappa\|_2^2 + \lambda \sum\nolimits_{d=1}^{D} \|W_d^1\|_2,$$

wherein D is number of features input to a local machine learning model, $h(\theta')$ is the original embedding output of the local machine learning model, K is the set of remaining embedding components, Wd is the $d^{th}$ group of weights at the input layer of the local machine learning model and $\lambda$ is a regularization coefficient.

5. The computer-implemented method of claim 1, further comprising determining, by the system, a plurality of updated embedding components from the one or more local machine learning models; and measuring, by the system, a distance between the plurality of embedding components and the plurality of updated embedding components.

6. The computer-implemented method of claim 1, wherein the optimization problem is defined as min θ0 ▒ (θ0,h▒ (θ1'),.Math.,h▒ (θM'))+λ ▒ .Math.k=1K.Math.Wk1.Math.2, wherein M is number of local machine learning models, h(θ.sub.M) is the one or more embedding vectors of the M.sup.th machine learning model, K is a sum of lengths of the one or more embedding vectors, w.sub.k.sup.1 is the k.sup.th group of weights at the input layer of the aggregator machine learning model, θ.sub.0 is aggregator models weights, l is a loss function and λ is a regularization coefficient.

7. A computer program product comprising a computer readable storage medium having program instructions embodied therewith, the program instructions executable by a processor to cause the processor to:

aggregate a plurality of embedding components from one or more local machine learning models to an aggregator machine learning model; and remove one or more embedding components from the plurality of embedding components based on minimizing weights at an input layer of the aggregator machine learning model notify the one or more local machine learning models of removal of the one or more embedding components; and remove one or more features from input layers of the one or more local machine learning models based on the removing of the one or more embedding components;

wherein minimizing the weights further comprises solving via the aggregator machine learning model, an optimization problem.

8. The computer program product of claim 7, wherein removal of the one or more features from the input layers of the one or more local machine learning models further comprises minimizing weights at the input layers of the one or more local machine learning models.

9. The computer program product of claim 8, wherein the minimizing weights at the input layers of the one or more local machine learning models further comprises solving a second optimization problem.

10. The computer program product of claim 9, wherein the second optimization problem is defined as $$\min_\theta \|h(\theta')\kappa - h(\theta)\kappa\|_2^2 + \lambda \sum\nolimits_{d=1}^{D} \|W_d^1\|_2,$$

wherein D is number of features input to a local machine learning model, $h(\theta')$ is the original embedding output of the local machine learning model, K is the set of remaining embedding components, Wd is the $d^{th}$ group of weights at the input layer of the local machine learning model and $\lambda$ is a regularization coefficient.

11. The computer program product of claim 7, wherein the program instructions further cause the processor to: determine, a plurality of updated embedding components from the one or more local machine learning models; and measure a distance between the plurality of embedding components and the plurality of updated embedding components.

12. The computer program product of claim 7, wherein the optimization problem is defined as min θ0 ▒ (θ0,h▒ (θ1'),.Math.,h▒ (θM'))+λ ▒ .Math.k=1K.Math.Wk1.Math.2, wherein M is number of local machine learning models, h(θ.sub.M) is the one or more embedding vectors of the M.sup.th machine learning model, K is a sum of lengths of the one or more embedding vectors, w.sub.k.sup.1 is the k.sup.th group of weights at the input layer of the aggregator machine learning model, θ.sub.0 is aggregator models weights, l is a loss function and λ is a regularization coefficient.

13. A system comprising: a memory that stores computer executable components; and a processor, operatively coupled to the memory, that executes the computer executable components stored in memory, wherein the computer executable components comprise: an aggregator machine learning model that aggregates a plurality of embedding components from one or more local machine learning models, and removes one or more embedding components from the plurality of embedding components based on minimizing weights at an input layer of the aggregator machine learning model a communications component that notifies the one or more local machine learning models of the removal of the one or more embedding components, wherein the one or more local machine learning models remove one or more features from input layers of the one or more local machine learning models based on the removing of the one or more embedding components;

wherein minimizing the weights at the input layer of the aggregator machine learning model comprises solving an optimization problem.

14. The system of claim 13, wherein removal the one or more features from input layers of the one or more local machine learning models further comprises minimizing weights at the input layers of the one or more local machine learning models.

\* \* \* \* \*